Figure 1:
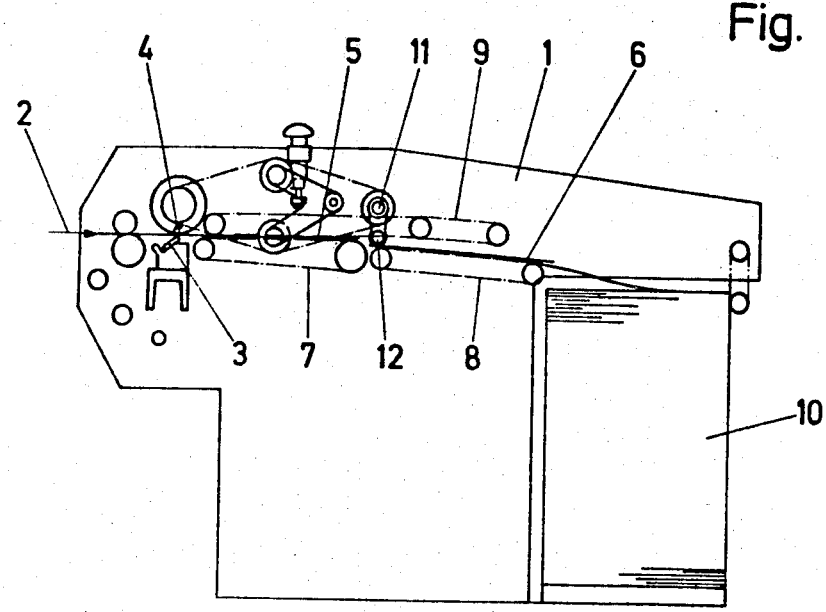

United States Patent [19]

Breunig

[11] 4,376,531
[45] Mar. 15, 1983

[54] DEVICE FOR TRANSPORTING SHEETS ON PRINTING MACHINES

[75] Inventor: Anton Breunig, Dilsberg, Fed. Rep. of Germany

[73] Assignee: Heidelberger Druckmaschinen AG, Heidelberg, Fed. Rep. of Germany

[21] Appl. No.: 116,932

[22] Filed: Jan. 30, 1980

[30] Foreign Application Priority Data

Jan. 31, 1979 [DE] Fed. Rep. of Germany ....... 2903596

[51] Int. Cl.³ ............................................. B65H 29/66
[52] U.S. Cl. ......................................... 271/202; 83/88
[58] Field of Search ....................... 271/202, 197, 178; 83/88

[56] References Cited

U.S. PATENT DOCUMENTS 3,994,221 11/1976 Littleton ........................ 271/202 X
4,040,617 8/1977 Walkington ..................... 271/202 X Primary Examiner—Richard A. Schacher
Attorney, Agent, or Firm—Herbert L. Lerner; Laurence A. Greenberg

[57] ABSTRACT

Device for transporting sheets on printing machines having a rejector shaft driven in rhythm with a flow of sheets, the rejector shaft carrying cams for deflecting the sheet ends downwardly to form an overlapping, fish-scalelike flow of the sheets including a belt drive for the rejector shaft and means for adjusting the belt drive so as to vary the instant of movement of the cams relative to the flow of sheets.

2 Claims, 2 Drawing Figures

U.S. Patent

Mar. 15, 1983

4,376,531

DEVICE FOR TRANSPORTING SHEETS ON PRINTING MACHINES

The invention relates to a device for transporting sheets on printing machines having a rejector shaft which is driven in rhythm with a flow of sheets and which carries cams for deflecting the sheet ends downwardly to form an overlapping, fish-scalelike flow of the sheets.

A heretofore known device of this general type (German Pat. DE-PS No. 23 48 320) uses suction rollers for transporting the sheets which have been cut in a cross-cutter. To form the overlap or fish-scalelike arrangement of the sheets, the end of the sheets are deflected downwardly out of the transporting or conveying plane by cams which are driven in synchronism with the suction transport device. The fish-scalelike overlap formation of the sheets to be delivered is necessary so that the speed thereof can be reduced immediately before the delivery thereof in order to ensure a reliable and uniform delivery.

It has been found that the rhythmically transported sheets experience slippage with respect to the transport means therefor, the amount of slip varying in accordance with the type of paper used, the surface of the paper, the weight of the sheet being transported, the suction power and surface quality of the transport means and the like. Since the spacing between the individual sheets is kept as small as possible in order not to accelerate the sheets unnecessarily, the varying amount of slippage may cause disturbances or disruptions in the sheet transport. If, for example, due to a very great amount of slippage, the end of the leading sheet is not completely deflected and the sheet immediately following thereafter strikes the end of the leading sheet, the formation of a fish-scalelike overlap is impossible, and the printed sheets are ruined.

It is accordingly an object of the invention to provide a device for transporting sheets on printing machines having a simple and economical device for shifting the phase of the cam-bearing rejector shaft relative to the rhythm of the sheets being fed in, the phase-shifting device being operable when the printing machine is shut down and when it is running.

With the foregoing and other objects in view, there is provided, in accordance with the invention, a device for transporting sheets on printing machines having a rejector shaft driven in rhythm with a flow of sheets, the rejector shaft carrying cams for deflecting the sheet ends downwardly to form an overlapping, fish-scalelike flow of the sheets comprising a belt drive for the rejector shaft, and means for adjusting the belt drive so as to vary the instant of movement of the cams relative to the flow of sheets. By turning the rejector shaft with respect to the end of the sheet, the shaft is adjustable exactly to varying amounts of slippage in order to avoid any disruption of the fish-scalelike overlap formation.

In accordance with another feature of the invention, a swivelable double-arm lever is disposed between a driving belt strand and a driven belt strand of the belt drive, respective rollers are mounted on the arms of the double-arm lever and are engageable with both of the belt strands for deflecting the belt strands, and an adjusting spindle is provided engaging one of the arms of the double-arm lever. In this manner, with the use of simple means, a phase shift of the rejector shaft with respect to the sheets being fed-in is achieved, the adjustment being able to be effected both while the printing machine is shut down and is running. The construction according to the invention also permits a rigid drive in both rotary directions which causes no shifting of the rejector shaft during braking of the printing machine. The rejector shaft is non-flexible or non-resilient so that no change in the phase relationship of the cams to the sheets can occur. Furthermore, the double-arm lever during adjustments provides a double, non-flexible or non-resilient adjustment travel of the cam with respect to the end of the respective sheet.

In accordance with a concomitant feature of the invention, the sheet transporting device is in combination with a cross-cutter having a rotary shaft, the belt drive being a serrated transmission belt connecting the rotary cross-cutter shaft to the rejector shaft for driving the latter.

Other features which are considered as characteristic for the invention are set forth in the appended claims.

Although the invention is illustrated and described herein as embodied in a device for transporting sheets on printing machines, it is nevertheless not intended to be limited to the details shown, since various modifications and structural changes may be made therein without departing from the spirit of the invention and within the scope and range of equivalents of the claims.

Figure 2:
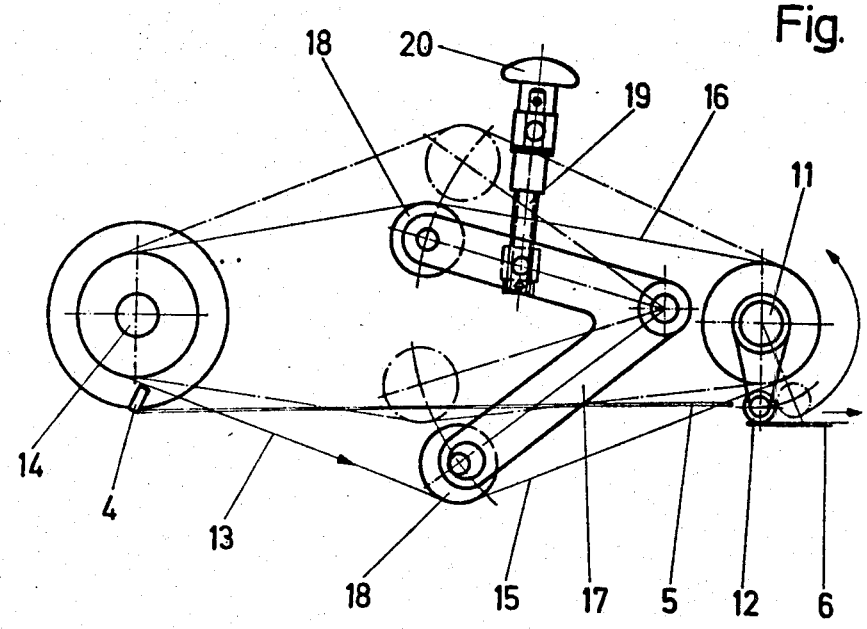

The construction and method of operation of the invention, however, together with additional objects and advantages thereof will be best understood from the following description of specific embodiments when read in connection with the accompanying drawings, in which:

FIG. 1 is a diagrammatic side elevational view of a cross-cutter forming part of the device for transporting sheets on printing presses in accordance with the invention; and FIG. 2 is a fragmentary view of FIG. 1 showing the adjustment device thereof in a different phase of operation.

Referring now the the figures of the drawing, there is shown a paper web 2 being fed in a conventional manner into a rotary cross-cutter 1 and being cut into sheets 5 and 6 of a given size or format between a stationary knife 3 and a revolving knife 4. The sheets 5 and 6 are transported by conveyor belts 7,8 and 9 to a delivery pile 10. In this connection, the conveyor belts 7 and 9 move at a slightly greater speed than the speed at which the paper web 2 travels, and the conveyor belt 8 moves at a considerably slower speed than that at which the paper web 2 moves so as to permit a slowed-down, fish-scalelike delivery of the sheets 5 and 6.

In order to deflect the end of the respective sheet 6 reliably out of the path of movement thereof, a rejector shaft 11 is provided above the conveyor belt 8. The rejector shaft 11 is driven in rhythm with the sheet flow or sequence and is provided with cams 12 with which it forces the sheet end downwardly (FIG. 1).

As is apparent from FIG. 2, the rejector shaft 11 is driven through a belt drive 13 by a rotary shaft 14 of the cross-cutter 1 which carries the revolving knife 4. A swivelable bellcrank or double-arm lever 17 is disposed between a driving belt strand 15 and a driven belt strand 16. Rollers 18 are mounted, respectively, on each of the lever arms of the double-arm lever 17, one of the rollers 18 being eccentrically mounted for tensioning the belt drive 13. The two belt strands 15 and 16 are deflected by the two rollers 18 so that, upon adjustment of the double-arm lever 17, a phase adjustment or shift of the rejector shaft 11 relative to the cross-cutter shaft 14 and relative to the sheet 5 results. An adjusting spindle 19 is provided for effecting the adjustment of the double-arm lever 17, the spindle 19 being very delicately and sensitively turnable by means of a handwheel 20.

The instant the cams 12 move with respect to the sheet flow is variable by means of the double-arm lever 17, so that the cam 12 always precisely or accurately forces the end of the leading sheet 6 downwardly. The sheet 5 following immediately thereafter can thus slide fish-scalelike over the leading sheet 6 whereby the rejector shaft 11 turns counterclockwise, as viewed in FIG. 2.

The belt drive 13 used for driving the rejector shaft 11 can advantageously be a toothed or serrated belt; however, other drive means, such as roller chains, for example, or the like may also be used.

There are claimed:

1. Device for transporting sheets on printing machines having a rejector shaft driven in rhythm with a flow of sheets, the rejector shaft carrying cams for deflecting the sheet ends downwardly to form an overlapping, fish-scalelike flow of the sheets comprising a belt drive for the rejector shaft, and means for adjusting said belt drive so as to vary the instant of movement of the cams relative to the flow of sheets, said adjusting means comprising a swivelable double-arm lever disposed between a driving belt strand and a driven belt strand of said belt drive, respective rollers mounted on the arms of said double-arm lever and engageable with both of said belt strands for deflecting said belt strands, and an adjusting spindle engaging one of the arms of said double-arm lever.

2. Device according to claim 1 in combination with a cross-cutter having a rotary shaft, wherein said belt drive is a serrated transmission belt connecting the rotary cross-cutter shaft to the rejector shaft for driving the latter.

* * * * *